2,379,220

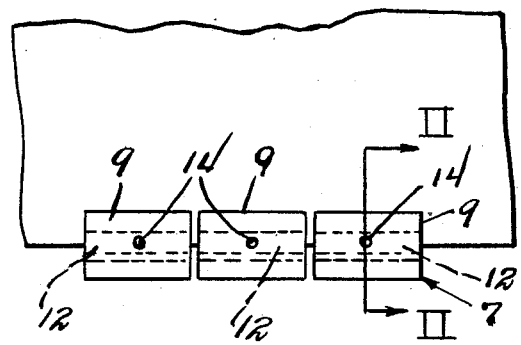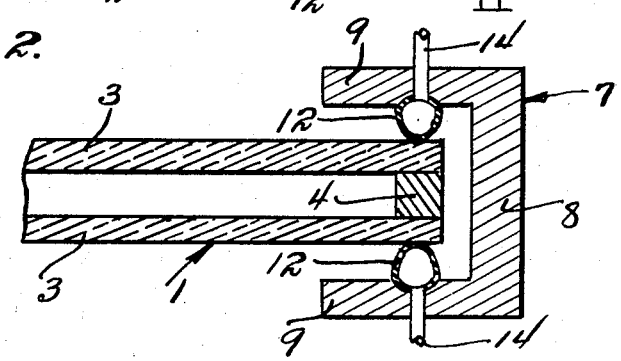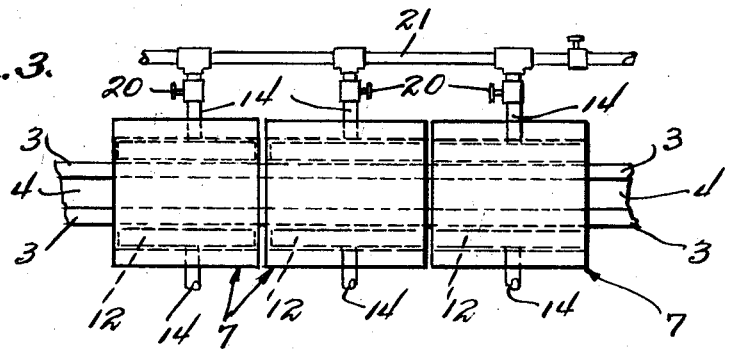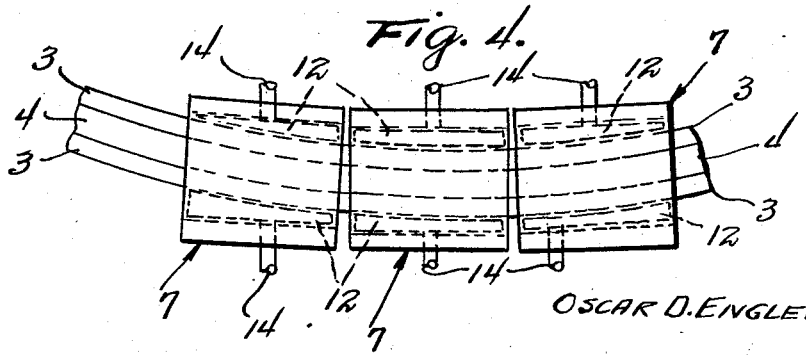
Inventor
OSCAR D. ENGLEHART
By Olen E. Bee
Attorney Patented June 26, 1945

UNITED STATES PATENT OFFICE 2,379,220

APPARATUS FOR MANUFACTURING MULTIPLE GLAZED UNITS

Oscar D. Englehart, Brackenridge, Pa., assignor to Pittsburgh Plate Glass Company, Allegheny County, Pa., a corporation of Pennsylvania Original application May 28, 1941, Serial No. 395,568. Divided and this application July 1, 1942, Serial No. 449,296

1 Claim. (Cl. 154—27)

The present invention relates to insulating constructions and more particularly to an apparatus for manufacturing multiple glazed units.

The invention described and claimed herein constitutes a division of my copending application, Serial No. 395,568, filed May 28, 1941, for Process of manufacturing multiple glazed units.

One object of the invention is to provide an apparatus, the use of which will facilitate the fabrication of multiple glazed units and reduce the amount of breakage normally incident to such production.

A second object of the invention is the provision of an apparatus which may be used in the manufacture of both flat and curved multiple glazed units.

Other objects and advantages of the invention will become more apparent from the following detailed description of a preferred embodiment thereof.

With the current wide-spread adoption of multiple glazing in the building and transportation industries, much effort is being directed toward a mass production of the multiple glazed units themselves. Obviously, lowered manufacturing costs will foster an even greater adoption of these units than has heretofore been experienced.

Generally, an insulating window construction comprises a plurality of glass plates maintained in spaced parallel relation and sealed at the edges to form an enclosed air space which possesses good insulating properties. Considerable trouble is met, however, in the fabrication of a construction of this type and the creation of a satisfactory edge seal. In some instances the assembly is merely held in a jig until the adhesive joining the spacer to the glass plates solidifies. Where a thermoplastic spacer is utilized, the assembly is heated and the weight of the uppermost plate causes a compression and weld of the spacer to the plates. Ordinarily where a positive pressure is employed during the manufacturing operation, it is applied uniformly over the entire assembly with the result that the unsupported central areas of the glass plates are frequently ruptured. In addition to the foregoing difficulties, special provision must be made to handle curved plates and individual molds or forms prepared in most instances.

One of the principal features of the invention involves an arrangement of pressing clamps, adaptable to both flat and curved plates of glass, for exerting an edge pressure on multiple glazed assemblies.

In the drawing, Figure 1 is a fragmentary elevation of an apparatus according to my invention and as applied to the formation of a multiple glazed unit;

Figure 2 is a fragmentary vertical section taken substantially along the line II—II of Fig. 1;

Figure 3 is a fragmentary end elevation of the structure shown in Fig. 1; and

Figure 4 is a fragmentary end elevation of the apparatus as applied to the formation of a curved multiple glazed unit.

Referring to the drawing, a multiple glazed unit 1 comprises a plurality of glass plates 3 maintained in spaced parallel relation by a marginal spacer 4 of suitable material. The spacer 4 may be composed of a thermoplastic material, such as a polyvinyl acetal resin or an acrylate, which will soften and adhere directly to the glass at a temperature below 300 degrees F., or a resilient material, such as rubber or the like in which case a separate adhesive is employed to bond the spacer to the glass plates. The spacer 4 can also be in the form of rigid metal in combination with covering layers of thermoplastic material if desired.

At intervals about the margin of the unit 1 are placed a plurality of pressing clamps 7 which exert an edge pressure only upon the unit. Each clamp 7 comprises a metal section 8 substantially of U-shape in cross-section with opposed flange portions 9 overlying the surfaces of the unit 1. The flanges 9 carry opposed tubular diaphragms 12 parallel to each other and to the edges of the flanges. These diaphragms are of such size and are so spaced that when supplied with fluid through ducts 14 they expand, contact the edges of the unit 1 and exert pressure thereon. Suitable valves 20 are provided for the ducts 14 to control the degree of expansion and contraction of the diaphragms 12. The several ducts may be connected in series to a fluid supply line 21 or may be operated individually as desired.

In operating the apparatus, the elements of a multiple glazed unit are assembled in proper superposed relation and the pressing clamps 7 are disposed about the marginal areas thereof. The diaphragms 12 are expanded to exert pressure from opposite directions along the edges or marginal portions of the unit. If necessary, the complete assembly is placed in an oven to facilitate the pressing and sealing operation. After the unit has been fabricated, it is allowed to cool and thereafter the clamps are removed.

The number of clamps, the degree of pressure and the temperature required in the process will depend, of course, upon the nature of the material from which the spacer 4 is formed. Where this spacer is a plasticized polyvinyl acetal resin, clamps in sufficient number to cover substantially the entire margin of the unit are necessary. The diaphragms are expanded to exert a pressure of approximately 10 pounds per square inch along the edges and the unit is heated to a temperature of about 100 degrees C. in order that a satisfactory seal between the resin and the glass plates will result. The conditions of temperature and pressure are maintained for approximately 100 minutes and the unit is then cooled substantially to room temperature before the pressure is released. Obviously, variations in the composition of the spacer 4 will cause comparable changes in the conditions of temperature and pressure.

Through the use of the tubular diaphragms 12 within the clamps 7 a uniform pressure is applied to the edges of the unit even where the glass plates 3 are curved, as shown in Fig. 4. Accordingly manufacture of specially shaped multiple glazed units is possible in the simple apparatus used to fabricate ordinary flat units.

Although illustrative forms of the invention have been shown and described in detail, it will be apparent to those skilled in the art that the invention is not so limited but that various changes can be made therein without departing from the spirit of the invention or from the scope of the appended claim.

I claim:

An apparatus for manufacturing a multiple glazed unit comprising a rigid channel member having opposite walls defining sides of a channel in which marginal portions of a multiple glazed unit are adapted to be inserted, a pair of deformable inflatable tubes secured to said walls in opposed parallel relation to each other and to the outer edges of the channel sides for receiving marginal portions of the multiple glazed units therebetween, and fluid supply means connected to the tubes whereby the latter can be expanded under predetermined pressure equally distributed against the marginal portions of the multiple glazed unit.

OSCAR D. ENGLEHART.